United States Patent
Cronin et al.

(10) Patent No.: US 6,586,505 B1
(45) Date of Patent: *Jul. 1, 2003

(54) AQUEOUS RESIN DISPERSION

(75) Inventors: Michael J. Cronin, Landenberg, PA (US); Peter M. Dunckley, Hockessin, DE (US); George J. Kutsek, Liberty, PA (US)

(73) Assignee: Eastman Chemical Resins, Inc., Kingsport, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 111 days.

(21) Appl. No.: 08/787,655

(22) Filed: Jan. 21, 1997

Related U.S. Application Data

(60) Provisional application No. 60/011,024, filed on Feb. 2, 1996.

(51) Int. Cl.$^7$ ............................................. C08L 89/00
(52) U.S. Cl. ..................... 524/18; 523/319; 524/19; 524/25; 524/26; 524/430; 524/432; 524/704
(58) Field of Search ................ 524/25, 19, 704, 524/26, 18, 430, 432; 523/319

(56) References Cited

U.S. PATENT DOCUMENTS

| | | | | |
|---|---|---|---|---|
| 2,393,179 A | * | 1/1946 | Mashburn .................. | 106/143 |
| 3,379,666 A | | 4/1968 | Becker | |
| 3,719,517 A | * | 3/1973 | Gladstone et al. .......... | 524/389 |
| 3,887,539 A | * | 6/1975 | Barth ....................... | 524/322 |
| 3,943,252 A | * | 3/1976 | Schroer et al. .............. | 524/25 |
| 4,048,125 A | | 9/1977 | Ingram, II | |
| 4,092,279 A | * | 5/1978 | Piskoti ....................... | 524/25 |
| 4,440,884 A | * | 4/1984 | Jannush ..................... | 524/25 |
| 4,477,622 A | * | 10/1984 | Sanderson et al. .......... | 524/458 |
| 4,501,845 A | * | 2/1985 | Baus et al. ................. | 524/460 |
| 4,645,783 A | * | 2/1987 | Kinoshita ................... | 524/460 |
| 4,983,257 A | * | 1/1991 | Schultz et al. .............. | 162/158 |
| 5,201,944 A | * | 4/1993 | Nakata et al. ............... | 106/144 |
| 5,510,003 A | * | 4/1996 | Colasurdo et al. .......... | 162/158 |

FOREIGN PATENT DOCUMENTS

| | | | | |
|---|---|---|---|---|
| CA | 504163 | * | 7/1954 | .................. 524/25 |
| CA | 537466 | * | 2/1957 | .................. 524/25 |
| CA | 682851 | * | 3/1964 | .................. 524/25 |
| GB | 636 102 A | | 1/1945 | |
| GB | 919380 | * | 2/1963 | .................. 524/25 |
| GB | 921920 | * | 3/1963 | .................. 524/25 |
| GB | 1065015 | * | 4/1967 | .................. 524/25 |
| JP | 4731 | * | 1/1974 | .................. 524/25 |
| SU | 1432079 | * | 10/1988 | .................. 524/25 |

OTHER PUBLICATIONS

Derwent Publications Ltd. XP002055465 & JP 49 000 338 A (Hitachi Chemical Co. Ltd.) Jan. 5, 1974 (abstract).
Patent Abstracts of Japan, vol. 095, No. 008, Sep. 29, 1995 & JP 07 133473 A (Arakawa Chem. Inc. Co. Ltd.) May 23, 1995 (abstract).
Patent Abstracts of Japan, vol. 096, No. 002, Feb. 29, 1996 & JP 07 268181 A (Showa Highpolymer Co. Ltd), Oct. 17, 1995 (abstract).
Derwent Publications Ltd., XP002055466 & SU 1 691 381 (Volzhsk Nitrogen Oxygen Wks.), Nov. 15, 1991 (abstract).
Patent Abstracts of Japan, vol. 012, No. 011 (C–468), Jan. 13, 1988 & JP 62 167377 A (Arakawa Chem. Ind. Co. Ltd.) Jul. 23, 1987 (abstract).
Kutsek, Adhesives Age, "Tackifying Resin Dispersions: More Than Just Soap and Water", (Jun. 1996).
Hercules Powder Company, "Hercules Dresinol Resin Dispersions, Modifiers of Polymeric Film Formers in Aqueous Systems", (1956).
Mosher, "The Technology of Coated and Processed Papers", pp. 99–104, (1952).
Martens, "Emulsion and Water–Soluble Paints and Coatings", pp. 43–45, 58–63, and 103–104, (1964).
Carl, "Neoprene Latex, Principles of Compounding and Processing", pp. 7, 100–101, and 132, (1962).
Ward et al., "Report No. 54–3, Neoprene Latex Adhesives", pp. 38–39, and 42, Sep. (1954).
Gelbert, "Progress in Neoprene Latex Adhesives", (Jun. 15, 1960).

* cited by examiner

*Primary Examiner*—Judy M. Reddick
(74) *Attorney, Agent, or Firm*—B. J. Boshears; Harry J. Gwinnell

(57) ABSTRACT

This invention relates to aqueous resin dispersions comprising water, resin, a surfactant, and a caseinate. This invention also relates to the process for producing the aqueous resin dispersion and to adhesives formulated with the aqueous resin dispersion.

22 Claims, No Drawings

AQUEOUS RESIN DISPERSION

CROSS REFERENCE TO RELATED APPLICATIONS

This application claims the benefit of U.S. Provisional Application No. 60/011,024 filed on Feb. 2, 1996; the disclosure of which is incorporated by reference.

FIELD OF THE INVENTION

This invention relates to aqueous resin dispersions comprising water, resin, a surfactant, and a caseinate. This invention also relates to the process for producing the aqueous resin dispersion and to adhesives formulated with the aqueous resin dispersion.

BACKGROUND OF THE INVENTION

Resin dispersions can be produced through a variety of mechanisms and equipment configurations. They may range from total solvent systems to solvent-assisted systems to solvent-less systems (100% water-based). In a total solvent system, resin is dissolved in a hydrocarbon solvent and used in a solvent medium. In a solvent-assisted system, resin is cut in a hydrocarbon solvent at a minimum level required to assist the emulsification and is subsequently added to water.

Contact adhesives typically require both high temperature strength and good contactability. This can be achieved through the use of resin dispersions based upon relatively high softening point resins in combination with either a lower softening point resin to improve contactability, or an even higher softening point resin to improve high temperature strength. However, production of such resin dispersions is difficult without use of a hydrocarbon solvent and requires pressurized dispersing systems which are relatively expensive. If the softening point of the base resin exceeds 85° C., the resin dispersion must be produced under elevated pressure to prevent the aqueous phase of the dispersion from boiling. This equipment is both expensive and complex in nature.

Furthermore, emulsification of resins with small particle size and distribution requires selection of proper emulsifier system and equipment. This becomes more complex as softening point of the resin increases. Consequently, many high softening point resin dispersions, such as terpene phenolics, are larger in particle size and often contain a bimodal particle size distribution with a significant level of very large particles. This bimodal character with larger particle size contributes to instability in these resin dispersions often manifesting as decreased shelf-life. Also, these resin dispersions can develop grit and coagulation problems.

Until now, water-based contact adhesive formulators have been forced to either (1) use solvent-assisted resin dispersions, however use of these materials are becoming undesirable due to increased regulation due to their solvent content; (2) use complex blends of high and low softening point resin dispersions to achieve the required contactability without destroying the high temperature strength performance; or (3) produce adhesive formulations which exhibit inferior performance as compared to total solvent systems- and solvent-assisted systems.

In the past, casein has been used in solvent-less systems as an emulsifier. Casein emulsified resin dispersions were good tackifiers for polymers typically used in water-based contact adhesives, such as polychloroprene. However, due to biological attack and/or natural degradation of casein, casein-emulsified products are less desirable as compared to those resin dispersions produced with synthetic emulsifiers which are relatively resistant to. microbial degradation.

Casein solutions have been used in water-based resin dispersions to disperse resin in the water phase. In this role, the casein solution serves as the only or primary emulsifier and is integral in establishment of particle size and distribution. A side benefit of casein's presence in these resin dispersions is an improvement in high temperature strength seen in products used in water-based contact adhesives.

In those resin dispersions where casein is used to form a dispersion of resin in an aqueous phase, degradation of the casein leads to partial or complete dispersion failure. When used as a primary surfactant, once the casein is destroyed the resin dispersion is destroyed. When used as a primary surfactant the amount of casein used in dispersions is limited by the amount required to disperse the resin phase.

The invention differs from the traditional role of casein in resin dispersions, in that casein in the form of a caseinate solution functions solely as a performance additive. Since the caseinate solution does not contribute to the dispersement of the resin or participate in the creation of particle size of the resin in the dispersion, the caseinate solution does not significantly effect stability of the resin dispersion to which it is added.

The invention is particularly useful in water-based contact adhesives, which require both high temperature performance and good contactability or combinability. Those skilled in the art of water-based contact adhesive formulations have in the past used multiple resin dispersions to achieve adhesive formulations with contactability and high temperature strength. This approach requires a complex balance of low and high softening point resin dispersions. A further complication, aside from logistical concerns of handling multiple resin dispersions, is interaction of various included surfactants contained in the resin dispersion and their effect on adhesives containing these dispersions.

The invention provides both the desired contactability and combinability typical of lower softening point resin dispersions and the high temperature performance often associated with higher softening point resin dispersions in a solvent-less system.

SUMMARY OF THE INVENTION

The invention relates to a process for producing an aqueous resin dispersion comprising the steps of forming a mixture of resin and water and surfactant to form an aqueous resin dispersion precursor; and adding a caseinate solution to the aqueous resin dispersion precursor. Additional surfactant(s), thickener(s), performance additive(s), biocide/preservative(s), and antioxidant(s) may be blended with the resin dispersion precursor.

The process of the invention may be a process using either a direct method or an invert method. Also the process may be batch, semi-continuous or continuous in nature.

At any time after the resin dispersion precursor has been formed, a caseinate solution is added to the dispersion through any known mechanism, including simple mixing.

Additionally, the invention relates to a resin dispersion comprising a resin, water, a surfactant; and a caseinate solution.

The resin dispersion of the invention is combined with a polymer latex to produce an adhesive. Additional surfactant(s), thickener(s), performance additive(s), biocide/preservative(s) and antioxidant(s) may be blended with the resin dispersion precursor.

The resins may be aliphatic, aromatic, aliphatic-aromatic, or any combination thereof. Resins suitable for the aqueous resin dispersions of the invention include rosins and resins derived from wood, gum, and tall oil sources and blends thereof. These rosins and resins can be polymerized, disproportionated, hydrogenated, esters of aromatic and aliphatic alcohols, modified with phenolic compounds or other suitable polar compounds. The resins used may range in softening point from 10–190° C. and have molecular weights from 300–10,000 Mw. The most effective resins range in softening point from 60–120° C. and have molecular weights from 300–2,000 Mw.

Among the plasticizers of utility in resin dispersions of the invention include liquid or low softening point tackifying resins, petroleum-derived oils, aromatic hydrocarbon oils, paraffinic oils, napthenic oils, olefin oligomers, low molecular weight polymers, vegetable and animal oils and their derivatives.

Among the surfactants of utility in the resin dispersions of the invention include alkali metal soaps of carboxylates such as wood rosins, gum rosins, tall oil rosins, disproportionated rosins, polymerized rosins, hydrogenated rosins, esters thereof, and/or blends thereof. Surfactants may also be alkali metal salts, ammonium salts, or amine salts of alkyl sulphates, alkyl sulphonates, alkyl aryl sulphates, alkyl aryl sulphonates, ethoxylated alkylphenol sulfates, ethoxylated alkylphenol sulfonates, and sulfates and sulfonates of fatty acids.

Among the antioxidants of utility in the resin dispersions of the invention, it has been found that up to 0.5 wt % of BHT(2,6 di-tert-butyl para-cresol) or Tetrakis[methylene (3,5 di-tert-butyl-4-hydroxyhydrocinnamate)]methane is added to the resin dispersions of the invention to prevent oxidation and color degradation.

Suitable materials used as stabilizers and thickeners would include alkaline polyacrylate solutions, alkali soluble acrylic copolymer emulsions, cellulose derivatives, polyvinyl methyl ether, polyurethane thickeners, polyethylene oxide, natural gums (including, Guar Gum, GumArabic, Gum Karaya, alginates, casein) and polyvinyl alcohol. It is preferred not to use stabilizers and thickeners.

Casein solution in the resin dispersions of the invention may range from 0.5–20 parts dry casein per 100 parts dry resin. The most effective ranges are from 1–10 parts dry casein per 100 parts of dry resin.

The resin dispersion of the invention have solids content of 40–55%, viscosity of 2,000–9,000 centipoise, pH of 7–11 and mean particle diameter of less than 3 microns.

The invention relates to a water-based contact adhesive comprising a resin dispersion comprising a resin dispersed in water by a surfactant and a caseinate solution; and a polymer. The adhesive may be a contact adhesive or a pressure sensitive adhesive and the polymer may be in the form of a latex. Among the polymer latices useful in water-based contact adhesives are polychloroprene, natural rubber, styrene-butadiene rubber, acrylics and blends thereof.

DETAILED DESCRIPTION OF THE INVENTION

Aqueous resin dispersions of the invention may be produced through a process using either a direct method or an invert method. The process may be batch, semi-continuous or continuous in nature.

In a process which utilizes the direct method, an resin-in-water emulsion is created through use of equipment which induces high shear forces on a resin/water mixture, such as a homogenizer, a pebble-mill, Cowels mixer or high speed impeller. This equipment in addition to being able to induce high shear force may also be capable of generating high pressures and high temperatures. The direct method, although effective, does not produce the most stable resin dispersion. Direct method dispersions often exhibit larger and more widely distributed particle sizes, which contributes to resin dispersion instability.

In a process which utilizes the invert method, also known as chemical inversion, a water-in-resin mixture is initially prepared by suspending water droplets in a continuous resin phase. In a subsequent step, additional water is added to the mixture causing it to invert. The inverted mixture contains resin droplets dispersed in a continuous aqueous phase. The inversion process is the preferred method of manufacture for the invention.

A resin dispersion precursor comprises an aqueous mixture formed by blending molten resin(s), plasticizer(s), surfactant/emulsifier solution(s) and water. The resin dispersion precursor is dispersed by a process utilizing either the direct method or the invert method as described hereinabove. Additional. surfactant(s), thickener(s), performance additive(s), biocide/preservative(s) and antioxidant(s) may be blended with the resin dispersion precursor.

At any time after the resin dispersion precursor has been formed, a caseinate solution is added to the dispersion through any known mechanism, including simple mixing. It is preferred that the caseinate solution is added as a final step in the production of the inventive aqueous resin dispersions. The caseinate solution may be added at varied levels as required to meet performance objectives of adhesives to which the aqueous resin dispersions are added.

Resins suitable for the aqueous resin dispersions of the invention include rosins and resins derived from wood, gum, and tall oil sources and blends thereof. These rosins and resins can be polymerized, disproportionated, hydrogenated, esters of aromatic and aliphatic alcohols, modified with phenolic compounds or other suitable polar compounds.

Additional suitable resins for use in the invention are low molecular weight thermoplastic polymers derived from cracked petroleum distillates, terpene fractions, coal tar and a variety of pure monomers.

The resins may be aliphatic, aromatic, aliphatic-aromatic, or any combination thereof. Additionally, the resin may be developed through chemical reaction such as polymerization of pure or mixed character monomers, or through physical blending of precursor resins. The resins may be hydrogenated to any desired degree. Typical resins useful in the invention would include C5's, C9's, rosin acids, rosin esters, terpenes, terpene phenolics, hydrogenated versions of these and/or blends thereof.

The resins used may range in softening point from 10–190° C. and have molecular weights from 300–10,000 Mw. The most effective resins range in softening point from 60–120° C. and have molecular weights from 300–2,000 Mw. The physical properties of the resins are listed below:

| | Physical Properties of the resin | | |
| --- | --- | --- | --- |
| | Range | Preferred | More Preferred |
| Ring & Ball softening Point ° C. | 10–190 | 60–120 | 65–85 |
| Molecular weight, Mw | 300–10,000 | 300–2,000 | 300–1,500 |
| Molecular weight, Mz | 300–40,000 | 300–9,000 | 300–5,000 |

Plasticizer(s) may be incorporated into the resin dispersion precursor to aid in dispersion of the resin. Plasticizers are frequently added to resin dispersions to lower the effective softening point of the resin phase below maximum operating temperatures of equipment used in either the direct or indirect methods. Plasticizers are also added to resin dispersions to improve wetability characteristics of adhesives containing the resin dispersions. To be of utility, a plasticizer must be compatible with the resin and polymer contained in an adhesive. If the plasticizer is incompatible with the resin, the plasticizer will phase-separate and prevent formation of a resin dispersion. If the plasticizer is incompatible with the polymer when the adhesive dries, the plasticizer will migrate to the surface of the dried adhesive thereby reducing performance of the adhesive.

Among the plasticizers of utility in resin dispersions of the invention include liquid or low softening point tackifying resins, petroleum-derived oils, aromatic hydrocarbon oils, paraffinic oils, napthenic oils, olefin oligomers, low molecular weight polymers, vegetable and animal oils and their derivatives. However, it is preferred not to use plasticizers in the resin dispersions of the invention.

In solvent-less systems, a surfactant(s) is added to aid in dispersing resins into an aqueous phase and prevent spontaneous coalescence of resin particles contained in the resin dispersion. Among the surfactants of utility in the resin dispersions of the invention include alkali metal soaps of carboxylates such as wood rosins, gum rosins, tall oil rosins, disproportionated rosins, polymerized rosins, hydrogenated rosins, esters thereof, and/or blends thereof. Surfactants may also be alkali metal salts, ammonium salts, or amine salts of alkyl sulphates, alkyl sulphonates, alkyl aryl sulphates, alkyl aryl sulphonates, ethoxylated alkylphenol sulfates, ethoxylated alkylphenol sulfonates, and sulfates and sulfonates of fatty acids. Potassium soaps of hydrogenated wood rosin are the preferred surfactants.

An antioxidant(s) is typically used to help protect resin dispersions from oxidation. Hindered bis-phenols are typically used for resin dispersions used in applications where minimum staining and discoloration are desired. If discoloration and/or staining is unimportant, an amine-type antioxidants may be used. Antioxidants are typically added to the resin, the resin dispersion and the adhesive formulation containing the resin dispersion. Antioxidant loading levels are selected based upon Food and Drug Association (FDA) specified maximum loading levels, desired protection level and loading cost effectiveness. Among the antioxidants of utility in the resin dispersions of the invention, it has been found that up to 0.5 wt % of BHT(2,6 di-tert-butyl paracresol) or Tetrakis[methylene(3,5 di-tert-butyl-4-hydroxyhydrocinnamate)]methane is added to the resin dispersions of the invention to prevent oxidation and color degradation of adhesive formulations containing resin dispersions of the invention. Addition of BHT at 0.25 wt % to resin dispersions of the invention is preferred.

Water-soluble resins and gums can be used as stabilizers and thickeners in water-based resin dispersions. Suitable materials used as stabilizers and thickeners would include alkaline polyacrylate solutions, alkali soluble acrylic copolymer emulsions, cellulose derivatives, polyvinyl methyl ether, polyurethane thickeners, polyethylene oxide, natural gums (including, Guar Gum, Gum Arabic, Gum Karaya, alginates, casein) and polyvinyl alcohol. It is preferred not to use stabilizers and thickeners.

Biocides and preservatives are typically added to resin dispersions to prevent spoilage. Uncontrolled growth of bacteria in a resin dispersion may affect odor, viscosity, pH and other properties of the product. Heavy growth of bacteria in resin dispersions can result in gassing, coagulation, or clumping. Biocides and preservatives are typically added to resin dispersions in its final production phases.

Biocides and preservatives must be compatible with the resin dispersion system. Incompatible biocides or preservatives may effect both resin dispersion and adhesive formulation properties and performance. A water-based dispersion of BIT(1,2-benzisothiazolin-3-one) is a preferred biocide.

Casein is an amphoteric phosphoprotein that readily forms water-soluble salts with sodium or ammonium compounds in alkaline solutions. Casein may be manufactured by various methods including lactic acid, sulfuric acid, hydrochloric acid and rennet precipitation. Although any casein is useful in the caseinate solution of the invention, casein which is lactic acid precipitated from cow's milk with less than 2% fat content is preferred.

The preferred method of manufacture for the casein solution is to feed granules or particles of casein to a tank containing 70° C. de-ionized water under agitation. Approximately 15 minutes are required to swell the casein particles. The casein is then solubilized with an ammonium hydroxide solution. The solids content of the final solution is generally in the range of 10 to 20% by weight with a final pH between 7 and 10.5. The highest temperature used during solubilization varies but usually runs between 37 and 75° C.

The casein solution addition may range from 0.5–20 parts dry casein per 100 parts dry resin. The most effective ranges are from 1–10 parts dry casein per 100 parts of dry resin. Increased levels of casein solution may be added to resin dispersions to form products exhibiting the performance required for water-based contact adhesives.

The resin dispersion prior to the addition of the casein solution may have a wide range of characteristics. After modification with the caseinate solution, the resin dispersion's characteristics are largely similar, with the exception of viscosity. Solids levels are often adjusted to compensate for viscosity changes.

A resin dispersion of the invention have physical properties as follows:

|  | Range | Preferred |
| --- | --- | --- |
| Solids Content, % | 40–55 | 40–45 |
| Viscosity, centipoise | 2,000–9,000 | 2,000–3,000 |
| pH | 7–11 | 9–10 |
| Mean particle Diameter, microns | less than 3 | 0.25–0.35 |

Resin dispersion of the invention are useful in water-based contact adhesives to generate both contactability and high temperature strength performance. Likewise, the resin dispersion of this invention is useful in water-based pressure sensitive adhesives to generate greater peel, shear and tack performance.

The resin dispersion of the invention is combined with a polymer, preferably a polymer latex, to produce an adhesive. Among the polymer useful in water-based contact adhesives are polychloroprene, natural rubber, styrene-butadiene rubber, acrylics and blends thereof. Resin dispersions of the invention are particularly useful with polychloroprene latex, specifically anionic polychloroprene latex.

Water-based contact adhesive formulations based on polychloroprene are typically comprised of a polychloroprene polymer latex, multiple resin dispersions, a metal oxide and an antioxidant. Additional components such as curatives, antifoams, stabilizers, pH modifiers and viscosity modifiers may be included as required to meet performance objectives of the adhesive formulation.

Resin dispersion precursor formulations to which the caseinate solution are added are as follows:

| Item | Wide | Range | Preferred |
|---|---|---|---|
| Resin | 100 | 100 | 100 |
| Antioxidant | 0–5 | 0.25–1.0 | 0.25–1.0 |
| Plasticizer | 0–100 | 0–15 | 0–15 |
| Surfactant/Emulsifier | 2–25 | 2–15 | 2–10 |
| Stabilizer/Thickener | 0–20 | 0–5 | 0–3 |
| Biocide/Preservative | 0–1 | 0–0.5 | 0.05–0.10 |
| (all in dry parts by weight) | | | |
| Dilution Water | 36–600 | 36–400 | 80–350 |

These resin dispersion exhibit the following properties:

| Item | Wide | Range | Preferred |
|---|---|---|---|
| Solids, % | 30–74 | 30–74 | 30–56 |
| Viscosity, cps | 1,000–15,000 | 2,000–10,000 | 1,000–10,000 |
| pH | 7–12 | 8–11 | 9–11 |
| Mean Particle Diameter (microns) | 0.1–5.0 | 0.25–3.0 | <1.0 |

The caseinate solution useful in the invention is preferably an ammoniated casein solution having the following properties:

| Item | Wide | Range | Preferred |
|---|---|---|---|
| Solids, % | 1–25 | 1–15 | about 10 |
| pH | 7–11 | 8–10 | 7–8 |
| Loading Level (*) | 2–20 | 2–20 | 2–8 |

(*) Loading Level based on parts dry casein per 100 parts dry resin.

A typical water-based contact adhesive formulation used in experimental screening would contain a polychloroprene polymer latex, which may range from low to high crystallization rate and low to high gel content; a resin dispersion (s); and a metal oxide, such as zinc oxide to serve as an acid acceptor. Such a screening formulation is outlined below, all parts listed are by weight unless stated otherwise:

| | | |
|---|---|---|
| Polychloroprene Latex | 100 | parts |
| Resin Dispersion | 35–65 | parts |
| Metal Oxide | 2–5 | parts |

Water-based adhesives are tested and evaluated by a variety of methods. The test methods used in this application are as follows:

Test Methods

Room Temperature Cleavage/open Time:

Four square inch areas of both ½ inch thick particle board and high pressure plastic laminate are coated with approximately 0.2 grams of wet adhesive using an acid brush. The plastic laminate should have approximately another ½ inch of length uncoated, while the particle board should have uncoated areas on each side. The coated substrates are allowed to dry at ambient conditions for 30 minutes. The coated substrates are then laminated to one another using a lab laminator (Chemsultants International Laboratory Laminator) set at 30 psig pressure and 3 feet per minute roll speed. After 30 minutes conditioning at 23° C. and 50% relative humidity, the sample is debonded using an Instron Tensile Tester. The bonded area of the laminated substrates is positioned horizontally in the Tensile Tester with the top of the plastic laminate facing upward. The uncoated side areas of the particle board are attached to the bottom jaws, and the uncoated overhang of the plastic laminate is attached to the top jaws with a 30 inch cable and hook. As the particle board is held in position, the plastic laminate is peeled off or cleaved at 20 inches per minute cross head speed. The maximum load during debonding is recorded, and the amount of particle board failure and legging is noted. Three specimens are run for each adhesive. Mean maximum load is recorded. Test procedure is repeated using a 3 hour drying time for the coated substrates before lamination.

Elevated Temperature Cleavage:

Four square inch areas of both ½ inch thick particle board and high pressure plastic laminate are coated with approximately 0.2 grams of wet adhesive using an acid brush. The plastic laminate should have approximately another ½ inch of length uncoated, while the particle board should have uncoated areas on each side. The coated substrates are allowed to dry at ambient conditions for 30 minutes. The substrates are then laminated to one another using a lab laminator (Chemsultants International Laboratory Laminator) set at 30 psig pressure and 3 feet per minute roll speed. After 10 minutes at ambient conditions, the bonded area of the laminated substrates is positioned horizontally in a forced air oven at 80° C. with the top of the plastic laminate facing downward and the uncoated side areas of the particle held in position. After one minute equilibration time, a 1 kilogram weight is attached to the uncoated overhang portion of the plastic laminate. The time to bond failure is recorded to the nearest tenth of a minute. At least five specimens are tested for each adhesive. Mean failure time is recorded.

Shear Adhesion Failure Temperature (SAFT):

One square inch areas of both ½ inch thick particle board and high pressure plastic laminate are coated with approximately 0.05 grams of wet adhesive using an acid brush. The plastic laminate should have approximately another 1 inch of length uncoated, while the particle board should have uncoated areas on each side. The coated substrates are allowed to dry at ambient conditions for 30 minutes. The substrates are then laminated to one another using a lab laminator (Chemsultants International Laboratory Laminator) set at 30 psig pressure and 3 feet per minute roll speed. After 10 minutes at ambient conditions, the bonded area of the laminated substrates is positioned vertically in a forced air oven at room temperature with the top side of the plastic laminate facing outward and the uncoated side areas of the particle board held in position. A 1 kilogram weight is attached to the uncoated overhang portion of the plastic laminate and the oven temperature is ramped upward at 22° C. per hour. The temperature at which the bond fails or shears off is recorded. At least 3 specimens are tested for each adhesive. Mean SAFT is recorded.

Room Temperature Lap Shear (Ultimate Strength):

Two square inch areas of 3"×1" pieces of both ½ inch thick particle board and high pressure plastic laminate are coated with approximately 0.1 grams of wet adhesive using an acid brush. The coated substrates are allowed to dry at ambient conditions for 30 minutes. The substrates are then laminated to one another using a lab laminator (Chemsultants International Laboratory Laminator) set at 30 psig pressure and 3 feet per minute roll speed. A one inch overhang of substrate should be left on each end. After 24 hours conditioning at 23° C. and 50% relative humidity, the sample is debonded using an Instron Tensile Tester. The bonded area of the laminated substrates is positioned vertically in the Tensile Tester with the top of the plastic laminate facing outward. The sample is sheared at 0.2 inches per minute cross head speed. Half of the maximum load during shearing is recorded. Four specimens are tested for each adhesive. Mean half-maximum load is recorded.

Adhesive Sample Preparation:

The latex polymer is weighed into a tared container. Zinc oxide is then added to the polymer. The ammonium caseinate solution is added to the resin dispersion which is the last ingredient incorporated into the adhesive blend. All quantities are measured on a dry basis. All mixing is accomplished with a glass stir rod for 2 to 4 oz. sample sizes. Larger samples are prepared with a lightning mixer and coil stirrer set at approximately 500 rpm.

Solids (Non-Volatile Content):

This method utilizes a microwave drying system equipped with an integral digital computer and electronic balance. The tare weight, sample weight, and weight loss are determined by the North Atlantic Solids Analyzer. Drying time is 5 minutes at full oven power.

An alternate method determines the weight loss on triplicate 0.5 gram samples placed in a 120° C. vacuum oven for 30 minutes. The retained solids are accurately weighed and the results must be within 0.3% of each other to be considered valid.

pH:

A Beckman Atex-60 pH meter with Beckman S105A electrode is used to measure the pH of the sample. Successive measurements must agree within 0.2 pH units to be considered valid.

Viscosity:

Viscosity is measured with a Brookfield Model RVF viscometer with appropriate spindle for the range of sample (at 20 rpm and 25° C.+/−2° C. product temperature). The sample is placed in a 600 ml beaker.

Particle Diameter:

Mean Particle Diameter may be calculated using a Horiba LA900 particle size analyzer or by measuring the percent light transmission in a 100 ppm solids solution of the product using a visible spectrometer (tungsten illumination, 620 nm wavelength, 1 cm cell path). A deionized water blank is used. The percent light transmission is converted to mean particle size according to the following empirical equation:

mean particle diameter (microns)=(6.84/% Light Transmission)+0.132

Contact Adhesive Value Descriptors:

Particle board failure denotes the amount of particle board transferred to the plastic laminate during the debonding process. The descriptor (SP) denotes "slight" particle board failure meaning approximately 5% transfer. The descriptor (P) denotes between 5% and 20% transfer, while (GP) denotes "good" particle board failure and signifies between 20% and 50% transfer. The descriptor (VGP) denotes "very good" particle board failure signifying transfer of >50% and is usually accompanied by severe bending or breakage of the plastic laminate. Legging denotes the amount and width of adhesive strands which appear upon debonding. The descriptor (SL) denotes "slight" legging which is appearance of several weak strands with less than 25% coverage of the bonded area. The descriptor (L) denotes 25% to 50% coverage of approximately 1/16" strands, while descriptors of (GL) "good" and (VGL) "very good" indicate progression of coverage up to 75% and 100%. The descriptor (EL) "excellent" legging denotes indicates 100% coverage of strong, tight strands of approximately 1/8" width-and is usually accompanied with severe bending of the plastic laminate.

Pressure Sensitive Adhesive (PSA) Test Methods

Pressure Sensitive Adhesive Film Preparation:

Adhesives are coated at 1 mil dry coating thickness. A chrome roll coater is used to apply the wet adhesive onto 2 mil type A polyester film (MYLAR® film available from E. I. du Pont de Nemours and Company, Inc.) film. Adhesive films are dried at room temperature for 10 minutes and at 75° C. for 10 minutes before conditioning for 24 hours at 23° C. and 50% relative humidity. Adhesive films are cut into 1 inch wide strips of approximately 12 inch length.

180° Peel Test:

A conditioned one inch wide adhesive strip is placed lengthwise on a 5 inch length by 2 inch width substrate panel. The strip is bonded to the substrate using a 4.5 pound mechanical rolldown device from Chemsultants International. The adhesive strip is debonded at a 180° angle from the substrate panel at 12 inches per minute cross head speed on an Instron Tensile Tester. The average peel strength required to debond the strip between 2 and 6 inches of cross head displacement is recorded in ounces per linear inch. Three specimens are run for each adhesive on each substrate and the mean value is recorded. The substrate panels tested on are stainless steel (polished, 0.0625 inch thickness) and low density polyethylene (residue-free, 0.125 inch thickness). This test method is based on the Pressure Sensitive Tape Council's method PSTC-1 (rev. 8/85).

178° Shear Test:

A conditioned one inch wide adhesive strip is placed on a 2 inch wide substrate panel so that there is one square inch of contact with the panel and a length of adhesive strip overhang at the bottom of the panel. One square inch of the adhesive strip is bonded to the substrate using a 4.5 pound mechanical rolldown device from Chemsultants International. The bonded panel is placed in a shear rig so that the back of the panel is at a 2° angle with the vertical axis, allowing no peel forces to act on the adhesive bond when a one kilogram weight is hung on the unbonded end of the adhesive strip. The time taken to shear the entire bonded area away from the panel is recorded to the nearest minute. Three specimens are run for each adhesive and the mean time to failure is recorded. The substrate panels tested on are stainless steel (polished, 0.0625 inch thickness) and corrugated cardboard (0.125 inch total thickness). This test method is based on the Pressure Sensitive Tape Council's method PSTC-7 (rev. 8/85).

Shear Adhesion Failure Temperature:

A conditioned one inch wide adhesive strip is placed on a 3 inch wide substrate panel so that there is one square inch of contact with the panel and a length of adhesive strip overhang at the bottom of the panel. One square inch of the adhesive strip is bonded to the substrate using a 4.5 pound mechanical rolldown device from Chemsultants International. The bonded panel is placed in a rig so that the back of the panel is at a 2° angle with the vertical axis, allowing no peel forces to act on the adhesive bond when a one kilogram weight is hung on the unbonded end of the adhesive strip. The rig is placed in a forced air oven and the temperature is ramped up from ambient at 22° C. per hour. The temperature at which the bond fails is recorded. Three specimens are run for each adhesive and the mean failure temperature is recorded.

Loop Tack Test:

A conditioned one inch wide adhesive strip is cut to a 7 inch length. A loop is made with the cut strip so that a one inch length of each end is overlapped and taped, leaving a 5 inch loop of exposed adhesive. The taped end of the loop is placed in the upper Instron jaws and a 1 inch by 2 inch substrate panel is held in position horizontally in the bottom jaws. The bottom edge of the upper jaws are brought to one inch above the substrate surface, allowing for one square inch of contact between the adhesive strip and the panel. After a 5 second dwell time, the adhesive strip is debonded at 20 inches per minute cross head speed. The maximum load during debonding is recorded. Three specimens are run for each adhesive and the mean maximum load is recorded. The substrate panels tested on are stainless steel (polished, 0.0625 inch thickness), low density polyethylene (residue-free, 0.125 inch thickness), and corrugated cardboard (0.125 inch total thickness).

Pressure Sensitive Adhesive Descriptors:

Failure Mode indicates the mode of the debonding process. The following descriptors are used to describe various debonding conditions.

Adhesive Failure (A) indicates no adhesive deposit on the substrate to which the adhesive strip is bonded.

Cohesive Failure (CF) indicates that an adhesive deposit is found on both the substrate and the adhesive strip, while (SC) denotes slight cohesive failure.

Adhesive Transfer (AT) indicates that the adhesive deposit is found only on the substrate to which the adhesive strip is bonded, while (ST) denotes slight adhesive transfer.

Erratic (E) denotes the smoothness of the debonding process, while (SE) denotes slight erratic behavior.

Legging is based on the amount and width of adhesive strands which appear upon debonding. Slight legging (SL) denotes the appearance of several weak strands with less than 25% coverage of the bonded area. (L) denotes 25% to 50% coverage of approximately 1/16" strands.

EXAMPLES

All amounts listed in the following examples are by weight, unless otherwise specified.

For the purpose of performance comparison, three commercial adhesives and an adhesive formulation which contains an amount of casein as an emulsifier in amounts as previously used in the art were tested to determine contactabilty/open time, high temperature performance and ultimate bond strength. A fifth comparative example (Comparative Example E) is also included. This data is found in Table I.

Comparative Example A polychloroprene water-based contact adhesive (FASTBOND 2000 Adhesive, available from Minnesota Mining and Manufacturing, Inc.).

Comparative Example B polychloroprene water-based contact adhesive (FASTBOND 30 NF Adhesive, available from Minnesota Mining and Manufacturing, Inc.).

Comparative Example C polychloroprene water-based contact adhesive (LOKWELD® H20 Adhesive, available from WilsonArt).

Comparative Example D 20 phr rosin acid dispersion having 45% solids, 87° C. softening point and 8.6 pH (DRESINOL® 215 dispersion, available from Hercules Incorporated); 20 phr rosin ester dispersion (AQUATACK™ 5590 dispersion, available from Arizona Chemical Corporation); 100 phr polychloroprene latex polymer AQUASTIK® 2161 latex, available from E.I. du Pont de Nemours and Company, Inc.); and zinc oxide (4 parts).

Comparative Example E 10 phr rosin ester dispersion having .55% solids, 92° C. softening point and 8.6 pH (PENTALYN® H-55WBX available from Hercules Incorporated); 30 phr terpene phenolic dispersion (SP 560 resin available from Schenectady Chemical Company); 100 phr polychloroprene latex polymer (AQUASTIK® 2540 latex available from E.I. du Pont de Nemours and Company, Inc.); and zinc oxide (4 parts).

TABLE I

| Test Method (units) | Com A | Com B | Com C | Com D | Com E |
|---|---|---|---|---|---|
| Contactability/Open Time = 0.5 hrs | 23.3 P | 27.2 GP | 25.6 SP | 26.6 P | 24.0 GP |
| Particle Board Failure Legging Character (maximum load – lbs, 4 sq in bond area) | L | L | GL | L | GL |
| Contactability/Open Time = 3.0 hrs | 24.5 P | 24.6 GP | 29.2 SP | 21.0 P | 23.0 GP |
| Particle Board Failure Legging Character (maximum load – lbs, 4 sq in bond area) | L | L | GL | L | L |
| High Temperature Performance – Cleavage (minutes with 1 kg load, 4 sq in bond area) | 4.2 | 6.2 | 4.2 | 3.8 | 5.9 |
| High Temperature Performance – SAFT (° C. with 1 kg load, 1 sq in bond area) | >150 | >100 | >130 | 110 | 85 |
| Ultimate Bond Strength (½ maximum load – lbs, 2 sq in bond area) | 113 | 137 | 137 | — | 88 |

For further comparison, several resin dispersions used in water-based contact adhesives were tabulated below (Table II). Each resin dispersion was used in the same base formulation consisting of, 100 parts of an anionic polychloroprene latex (AQUASTIK® 2161 latex, available from E.I. du Pont de Nemours and Company, Inc.), the specified resin dispersion (40 parts), and zinc oxide (4 parts). All of the resins listed below and found on Table II are available from Hercules Incorporated, Wilmington, Del.

Comparative Example 1 rosin ester dispersion having 55% solids, 100° C. softening point and 9.8 pH (TACOLYN® C100 dispersion available from Hercules Incorporated).

Comparative Example 2 rosin ester dispersion having 55% solids, 81° C. softening point and 9.7 pH (TACOLYN® 1085 dispersion available from Hercules Incorporated).

Comparative Example 3 rosin ester dispersion having 55% solids, 92° C. softening point and 8.6 pH (PENTALYN® H-55WBX available from Hercules Incorporated).

TABLE II

| Test Method (units) | Com 1 | Com 2 | Com 3 |
|---|---|---|---|
| Contactability/Open Time = 0.5 hrs | 30.4 | 28.8 | 21.8 |
| Particle Board Failure | SP | SP | SP |
| Legging Character (maximum load - lbs, 4 sq in bond area) | GL | GL | GL |
| Contactability/Open Time = 3.0 hrs | 29.7 | 28.4 | 30.1 |
| Particle Board Failure | SP | SP | SP |
| Legging Character (maximum load - lbs, 4 sq in bond area) | EL | L | GL |
| High Temperature Performance - Cleavage (minutes with 1 kg load, 4 sq in bond area) | 1.3 | 0.6 | 1.7 |
| High Temperature Performance - SAFT (° C. with 1 kg load, 1 sq in bond area) | 52 | 65 | 56 |

Based on the data presented in Tables I and II, it is clear that conventional resin dispersions based on lower softening point resins provided good contactability but failed in high temperature strength. Use of resin dispersions of the invention allows lower softening point resin dispersions, which are not suitable for contact adhesive applications on their own, to be used as a sole resin dispersion to produce an improved 100% water-based contact adhesive. Table III below presents data for the above-mentioned resin dispersions after modification with the invention. The evaluation was conducted in the same polymer system.

Example 1

TACOLYN® C100+2 parts Ammoniated Casein (AC).

Example 2

TACOLYN® 1085+2 parts AC

Example 3

PENTALYN® H-55WBX+2 parts AC.

TABLE III

| Test Method (units) | Ex 1 | Ex 2 | Ex 3 |
|---|---|---|---|
| Contactability/Open Time = 0.5 hrs | 20.5 | 30.3 | 28.2 |
| Particle Board Failure | P | SP | SP |
| Legging Character (maximum load - lbs, 4 sq in bond area) | GL | GL | GL |
| Contactability/Open Time = 3.0 hrs | 28.0 | 26.5 | 30.8 |
| Particle Board Failure | P | SP | SP |
| Legging Character (maximum load - lbs, 4 sq in bond area) | GL | L | GL |
| High Temperature Performance - Cleavage (minutes with 1 kg load, 4 sq in bond area) | 2.4 | 2.8 | 2.6 |
| High Temperature Performance - SAFT (° C. with 1 kg load, 1 sq in bond area) | 102 | 116 | 112 |

The invention also affected performance improvements in those resin dispersions dispersed in the presence of casein-type emulsifiers (Table IV). Although performance was significantly improved, the inherent instability of casein emulsified systems was unaffected. The issues of resin phase separation, gelation, large viscosity changes and grit remain unchanged when casein-type emulsifiers were used in the place of a surfactant which is relatively resistant to microbial degradation.

Comparative Example 4 an 85° C. rosin ester resin which has been dispersed using AC.

Example 4 the dispersion of Comparative Example 4 with an additional 2 parts AC.

TABLE IV

| Test Method (units) | Com 4 | Ex 4 |
|---|---|---|
| Contactability/Open Time = 0.5 hrs | 31.2 | 24.3 |
| Particle Board Failure | GP | GP |
| Legging Character (maximum load - lbs, 4 sq in bond area) | EL | EL |
| Contactability/Open Time = 3.0 hrs | 35.1 | 23.5 |
| Particle Board Failure | P | EP |
| Legging Character (maximum load - lbs, 4 sq in bond area) | VGL | EL |
| High Temperature Performance - Cleavage (minutes with 1 kg load, 4 sq in bond area) | 2.3 | 5.1 |
| High Temperature Performance - SAFT (° C. with 1 kg load, 1 sq in bond area) | 121 | 118 |
| Ultimate Bond Strength (½ maximum load - lbs, 2 sq in bond area) | 131 | 116 |

As is the case with almost any adhesive formulation, principle adhesive properties are dictated by performance of the polymer system contained in the adhesive formulation. Although significant performance differences were seen utilizing different polychloroprene latex polymers, the effect of the use of the resin dispersions of the invention remained consistent with each polymer used. Water-based contact adhesive performance was improved through use of the inventive resin dispersions regardless of the anionic polychloroprene polymer contained in the adhesive. Examples of these higher performance resin dispersions are outlined in Table V.

Comparative Example 5 a hydrocarbon resin dispersion having 55% solids, 85° C. softening point and 10 pH (TACOLYN® 5001 dispersion available from Hercules Incorporated).

Example 5 the resin dispersion of Comparative Example+4AC.

Comparative Example 6 hydrocarbon resin dispersion, 45% solids, 70° C. softening point, 10.5 pH.

Example 6 hydrocarbon resin dispersion of Comparative Example 7+4AC.

TABLE V

| Test Method (units) | Com 5 | Ex 5 | Com 6 | Ex 6 |
|---|---|---|---|---|
| Polymer AQUA-STIK® 2540 latex, available from E. I. du Pont de Nemours and Company, Inc.) | AquaStik® 2540 | AquaStik® 2540 | AquaStik 2540 | AquaStik 2540 |
| Contactability/Open Time = 0.5 hrs | 20.3 P | 26.5 GP | 25.3 SP | 26.5 GP |

TABLE V-continued

| Test Method (units) | Com 5 | Ex 5 | Com 6 | Ex 6 |
|---|---|---|---|---|
| Particle Board Failure Legging Character (maximum load – lbs, 4 sq in bond area) | L | L | L | GL |
| Contactability/Open Time = 3.0 hrs | 23.3 GP | 26.8 GP | 28.2 P | 24.7 VGP |
| Particle Board Failure Legging Character (maximum load – lbs, 4 sq in bond area) | GL | VGL | L | L |
| High Temperature Performance – Cleavage (minutes with 1 kg load, 4 sq in bond area) | 2.7 | 4.6 | 2.5 | 13.5 |
| High Temperature Performance – SAFT (° C. with 1 kg load, 1 sq in bond area) | 60 | 103 | 60 | >150 |
| Ultimate Bond Strength (½ maximum load – lbs, 2 sq in bond area) | 44 | 123 | 111 | 108 |

In addition to its use in contact adhesives, resin dispersions of the invention were useful in water-based pressure sensitive adhesives to generate greater peel, shear and tack. Among the polymer latices useful in water-based pressure sensitive adhesives are natural rubber, styrene-butadiene rubber, acrylics, polychloroprene, and blends thereof. The invention was particularly useful in natural rubber and natural rubber/styrene-butadiene rubber latex systems.

Conventional lower softening point resin dispersions typically used in many pressure sensitive adhesive formulations can be formed using caseinates as the primary surfactant in the resin dispersion. These resin dispersions are very effective in tackifying natural rubber and natural rubber/styrene butadiene rubber systems. The caseinate solution present in the resin dispersion increases adhesive performance in peel, shear and tack as noted in Table VI.

Example 7

50:50 natural rubber ("NR"): hydrocarbon resin dispersion having :50% solids, 70° C. softening point and pH 4.3 (PICCONOL® AA101 resin dispersion available from Hercules Incorporated).

Example 8

60:40 NR: the resin dispersion of Comparative Example 4.

Example 9

50:50 NR: the resin dispersion of Comparative Example 4.

Example 10

40:60 NR: the resin dispersion of Comparative Example 4.

TABLE VI

| Test Method (units) | Ex 7 | Ex 8 | Ex 9 | Ex 10 |
|---|---|---|---|---|
| 180 Peel (SS) | 12.8 A | 9.2 A | 17.6 A | 24.0 A |
| 180 Peel (LDPE) | 11.8 A | 7.7 A | 14.3 A | 18.6 A, SG |
| 180 Peel (CC) Fiber Tear | 5.6 None | 0.9 None | 7.4 Poor | 5.3 Poor |
| Loop Tack (SS) | 0.33 A | 0.9 A | 1.6 A | 0.5 A |
| 178 Shear (SS) | 3009 CF | 332 SC | 6898 SC | 7408 SC |

All samples were coated on creped kraft, dried 10 minutes at room temperature, 10 minutes at 75° C., and conditioned at 23° C. and 50% relative humidity overnight prior to testing.

However, as with the case in water-based contact adhesives, instability of a casein-emulsified resin dispersion is prohibitive for pressure sensitive adhesives as well.

The use of a caseinate solution as a performance additive in resin dispersion manufacture, rather than as its primary emulsifier, allows the above-mentioned adhesive performance advantages to be maintained and in some cases improved upon. Furthermore, without the risk of resin dispersion failure due to degradation of the primary emulsifier, resin dispersions with caseinate solutions as additives were used either alone or in conjunction with other material to tailor adhesive performance (Table IX). For example, adhesives comprising the resin dispersion of the invention with a natural rubber alone or in conjunction with styrene-butadiene rubber to create adhesives with desirable performance. This is particularly useful to those skilled in the art of pressure sensitive adhesive formulation, in that the addition of the inventive resin dispersion may provide a different balance of peel, shear and tack from which further modifications can be made to meet performance criteria.

Comparative Example 11

50:50 NR: PICCONOL® AA101 resin (available from Hercules Incorporated).

Example 12

50:50 NR: an 85° C. rosin ester resin (PERMALYN® 2085 resin available from Hercules Incorporated)+8 AC.

Example 13

30:20:50: styrene butadiene rubber (SBR) (ROVENE™ 9423 rubber available from Mallard Creek Polymers): NR: an 85° C. rosin ester resin (PERMALYN® 2085 resin)+8 AC.

TABLE VIII

| Test Method (units) | Com 11 | Ex 12 | Ex 13 |
|---|---|---|---|
| 180 Peel (SS) | 20.2 AT, L | 40.1 A | 53.2 A |
| 180 Peel (LDPE) | 17.4 ST, SL | 28 | 41 |
| Loop Tack (SS) | 40.5 A, SL | 38.9 A | 34.5 A, SE |
| Loop Tack (LDPE) | 15.4 A | 10.8 A | 9.7 A, E |
| 178 Shear (SS) | 178 | 33484 CF | 2785 CF |
| SAFT (SS) (° C.) | 73 | 125 | >150 |

It is not intended that the examples given here should be construed to limit the invention, but rather, they are submitted to illustrate some of the specific embodiments of the invention. Various modifications and variations of the present invention known to those of ordinary skill in the art can be made without departing from the scope of the invention.

We claim:

1. A process for producing an aqueous resin dispersion adhesive precursor, comprising:

forming a mixture of resin, water and a surfactant;

dispersing the resin in the water to form an aqueous dispersion; and after forming the aqueous dispersion, adding a caseinate solution to the aqueous dispersion, wherein the resin is selected from the group consisting of C-5 hydrocarbon resins, C-9 hydrocarbon resins, rosin acids, rosin esters, phenolic modified rosins, terpene resins, terpene phenolic resins, mixtures thereof and hydrogenated versions thereof, and has a molecular weight from 300 to 10,000 weight average molecular weight (MW).

2. The process for producing the aqueous resin dispersion adhesive precursor of claim 1, wherein at least one additional surfactant is blended with the aqueous dispersion.

3. The process for producing the aqueous resin dispersion adhesive precursor of claim 1, wherein at least one thickener is blended with the aqueous dispersion.

4. The process for producing the aqueous resin dispersion adhesive precursor of claim 1, wherein at least one performance additive is blended with the aqueous dispersion.

5. The process for producing the aqueous resin dispersion adhesive precursor of claim 1, wherein at least one biocide or preservative is blended with the aqueous dispersion.

6. The process for producing the aqueous resin dispersion adhesive precursor of claim 1, wherein at least one antioxidant is blended with the aqueous dispersion.

7. The process for producing the aqueous resin dispersion adhesive precursor of claim 2, wherein at least one thickener, at least one performance additive, at least one biocide or preservative and at least one antioxidant are blended with the aqueous dispersion.

8. The process for producing the aqueous resin dispersion adhesive precursor of claim 1, wherein the resin dispersion is produced using a batch mode.

9. The process for producing the aqueous resin dispersion adhesive precursor of claim 1, wherein the resin dispersion is produced using a semi-continuous method.

10. The process for producing the aqueous resin dispersion adhesive precursor of claim 1, wherein the resin dispersion is produced using a continuous method.

11. A water-based adhesive comprising:

a resin dispersed in water by a surfactant to form an aqueous dispersion;

a caseinate solution added to the aqueous dispersion; and a polymer latex suitable to produce an adhesive, wherein the resin is selected from the group consisting of C-5 hydrocarbon resins, C-9 hydrocarbon resins, rosin acids, rosin esters, phenolic modified rosins, terpene resins, terpene phenolic resins, mixtures thereof and hydrogenated versions thereof, and has a molecular weight from 300 to 10,000 weight average a molecular weight (MW), and the water-based adhesive is free from organic solvents.

12. The adhesive of claim 11 wherein the adhesive is a contact adhesive.

13. The adhesive of claim 11 wherein the adhesive is a pressure sensitive adhesive.

14. The adhesive of claim 12, wherein the polymer latex is selected from the group consisting of polychloroprene, natural rubber, styrene-butadiene rubber, acrylics, and blends thereof.

15. The adhesive of claim 14, wherein the polymer latex comprises a polychloroprene latex.

16. The adhesive of claim 15 wherein the polychloroprene latex comprises an anionic polychloroprene latex.

17. The adhesive of claim 11 wherein the adhesive further comprises a metal oxide.

18. The adhesive of claim 17 wherein the metal oxide comprises zinc oxide.

19. The adhesive of claim 13, wherein the polymer latex is selected from the group consisting of natural rubber, styrene-butadiene rubber, acrylics, polychloroprene and blends thereof.

20. The adhesive of claim 13, wherein the polymer latex comprises a blend of natural rubber and styrene-butadiene rubber latexes.

21. The adhesive of claim 13, wherein the polymer latex comprises natural rubber.

22. A process for producing an adhesive, comprising:

forming an aqueous resin dispersion comprising:

forming a mixture of resin, water and a surfactant;

dispersing the resin in the water to form an aqueous dispersion; and after forming the aqueous dispersion, adding a caseinate solution to the aqueous dispersion, wherein the resin is selected from the group consisting of C-5 hydrocarbon resins, C-9 hydrocarbon resins, rosin acids, rosin esters, phenolic modified rosins, terpene resins, terpene phenolic resins, mixtures thereof and hydrogenated versions thereof, and has a molecular weight from 300 to 10,000 weight average molecular weight (MW); and combining the aqueous resin dispersion with a polymer latex suitable to produce an adhesive.

* * * * *